United States Patent
Klein et al.

(10) Patent No.: US 11,893,347 B2
(45) Date of Patent: Feb. 6, 2024

(54) CONTRASTIVE META-LEARNING FOR ZERO-SHOT LEARNING

(71) Applicant: SAP SE, Walldorf (DE)

(72) Inventors: Tassilo Klein, Berlin (DE); Moin Nabi, Berlin (DE)

(73) Assignee: SAP SE, Walldorf (DE)

( * ) Notice: Subject to any disclaimer, the term of this patent is extended or adjusted under 35 U.S.C. 154(b) by 290 days.

(21) Appl. No.: 17/335,823

(22) Filed: Jun. 1, 2021

(65) Prior Publication Data
US 2022/0382979 A1    Dec. 1, 2022

(51) Int. Cl.
*G06F 40/284* (2020.01)
*G06N 20/00* (2019.01)
*G06F 40/30* (2020.01)

(52) U.S. Cl.
CPC ............ *G06F 40/284* (2020.01); *G06F 40/30* (2020.01); *G06N 20/00* (2019.01)

(58) Field of Classification Search
CPC ...... G06F 40/284; G06F 40/30; G06F 40/216; G06N 20/00; G06N 3/0455; G06N 3/0985
See application file for complete search history.

(56) References Cited

U.S. PATENT DOCUMENTS

| | | | | |
|---|---|---|---|---|
| 11,170,175 | B1 * | 11/2021 | Kohli | G06N 3/08 |
| 2021/0173872 | A1 * | 6/2021 | Tan | G06F 40/211 |
| 2021/0312128 | A1 * | 10/2021 | Pruksachatkun | G16H 10/60 |
| 2022/0051133 | A1 * | 2/2022 | Jacobs | G06F 18/214 |
| 2022/0237378 | A1 * | 7/2022 | El Asri | G06F 40/284 |

OTHER PUBLICATIONS

Abdou, M. et al., "The Sensitivity of Language Models and Humans to Winograd Schema Perturbations," Proc. of the 58th Annual Meeting of the Association for Computational Linguistics, pp. 7590-7604 (Jul. 5-10, 2020).

Chen, T. et al., "A Simple Framework for Contrastive Learning of Visual Representations," downloaded from https://arxiv.org/pdf/2002.05709.pdf, 20 pages (Jul. 1, 2020).

Cui, L. et al., "Does BERT Solve Commonsense Task via Commonsense Knowledge?" downloaded from https://arxiv.org/pdf/2008.03945v1.pdf, 15 pages (Aug. 10, 2020).

(Continued)

*Primary Examiner* — Bhavesh M Mehta
*Assistant Examiner* — Darioush Agahi
(74) *Attorney, Agent, or Firm* — Sterne, Kessler, Goldstein & Fox P.L.L.C.

(57) ABSTRACT

Disclosed herein are system, method, and computer program product embodiments for utilizing non-RAM memory to implement machine learning configured with a meta-learning training set (small dataset), to create a common-sense predictive language model, thus boosting the performance for downstream tasks. An embodiment operates by receiving a base sentence and perturbation sentences as an input and tokenizing the input to generate a sequence of tokens. Tokens of the semantic perturbation sentences are embedded with tokens of the base sentence as contextually similar tokens pairs to generate training data and classified to capture relationships of the base sentence and the perturbation sentences to generate a classification, which is used to train a language model.

20 Claims, 5 Drawing Sheets

(56) References Cited

OTHER PUBLICATIONS

Devlin, J. et al., "BERT: Pre-training of Deep Bidirectional Transformers for Language Understanding," downloaded from https://arxiv.org/pdf/1810.04805.pdf, 16 pages (May 24, 2019).

Emami, A. et al., "The KnowRef Coreference Corpus: Removing Gender and Number Cues for Difficult Pronominal Anaphora Resolution," Proc. of the 57th Annual Meeting of the Association for Computational Linguistics, pp. 3952-3961 (Jul. 28-Aug. 2, 2019).

Grill, J. et al., "Bootstrap Your Own Latent a New Approach to Self-Supervised Learning," 34th Conf. on Neural Information Processing Systems (NeurIPS 2020), Vancouver, Canada, 14 pages (2020).

Gruber, T.R., "Toward principles for the design of ontologies used for knowledge sharing," Int. J. Human-Computer Studies, vol. 43, pp. 907-928 (1995).

He, K. et al., "Momentum Contrast for Unsupervised Visual Representation Learning," IEEE/CVF Conf. on Computer Vision and Pattern Recognition (CVPR), pp. 9726-9735 (2020).

He, P. et al., "A Hybrid Neural Network Model for Commonsense Reasoning," Proc. of the First Workshop on Commonsense Inference in Natural Language Processing, pp. 13-21 (Nov. 3, 2019).

Kavumba, P. et al., "When Choosing Plausible Alternatives, Clever Hans can be Clever," Proc. of the First Workshop on Commonsense Inference in Natural Language Processing, pp. 33-42 (Nov. 3, 2019).

Klein, T. & Nabi, M., "Attention Is (not) All You Need for Commonsense Reasoning," Proc. of the 57th Annual Meeting of the Association for Computational Linguistics, pp. 4831-4836 (Jul. 28-Aug. 2, 2019).

Klein, T. & Nabi, M., "Contrastive Self-Supervised Learning for Commonsense Reasoning," Proc. of the 58th Annual Meeting of the Association for Computational Linguistics, pp. 7517-7523 (Jul. 5-10, 2020).

Kocijan, V. et al., "A Surprisingly Robust Trick for the Winograd Scherna Challenge," Proc. of the 57th Annual Meeting of the Association for Computational Linguistics, pp. 4837-4842 (Jul. 28-Aug. 2, 2019).

Kocijan, V. et al., "A Review of Winograd Scherna Challenge Datasets and Approaches," downloaded from https://arxiv.org/pdf/2004.13831.pdf, 7 pages (Apr. 23, 2020).

Levesque, H.J. et al., "The Winograd Schema Challenge," Proc. of the Thirteenth International Conference on Principles of Knowledge Representation and Reasoning, pp. 552-561 (2012).

Liu, H. et al., "Precise Task Formalization Matters in Winograd Schema Evaluations," Proc. of the 2020 Conference on Empirical Methods in Natural Language Processing, pp. 8275-8280 (Nov. 16-20, 2020).

Liu, Y. et al., "RoBERTa: A Robustly Optimized BERT Pretraining Approach," downloaded from https://arxiv.org/pdf/1907.11692.pdf, 13 pages (Jul. 26, 2019).

Marcus, G., "The Next Decade in AI: Four Steps Towards Robust Artificial Intelligence," downloaded from https://arxiv.org/ftp/arxiv/papers/2002/2002.06177.pdf, 59 pages (Feb. 17, 2020).

Rahman, A. et al., "Resolving Complex Cases of Definite Pronouns: The Winograd Schema Challenge," Proc. of the 2012 Joint Conference on Empirical Methods in Natural Language Processing and Computational Language Learning, pp. 777-789 (2012).

Ruan, Y. et al., "Exploring Unsupervised Pretraining and Sentence Structure Modelling for Winograd Schema Challenge," downloaded from https://arxiv.org/pdf/1904.09705.pdf, 7 pages (Apr. 22, 2019).

Saba, W. S., "Is there a 'Simple' Machine Learning Method for Commonsense Reasoning?" downloaded from https://arxiv.org/ftp/arxiv/papers/1810/1810.00521.pdf, 4 pages (Oct. 1, 2018).

Sakaguchi, K. et al., "WinoGrande: An Adversarial Winogra Schema Challenge at Scale," downloaded from https://arxiv.org/pdf/1907.10641.pdf, 9 pages (Nov. 21, 2019).

Tamborrino, A. et al., "Pre-training Is (Almost) All You Need: An Application to Commonsense Reasoning", downloaded from https://arxiv.org/pdf/2004.14074.pdf, 10 pages (Apr. 29, 2020).

Trichelair, P. et al., "On the Evaluation of Common-Sense Reasoning in Natural Language Understanding," downloaded from https://arxiv.org/pdf/1811.01778v1.pdf, 7 pages (Nov. 5, 2018).

Trichelair, P. et al., "How Reasonable are Common-Sense Reasoning Tasks: A Case-Study on the Winograd Schema Challenge and SWAG," Proc. of the 2019 Conference on Empirical Methods in Natural Language Processing and the 9th International Joint Conference on Natural Language Processing, pp. 3382-3387 (Nov. 3-7, 2019).

Trinh, T.H. and Le, Q.V., "A Simple Method for Commonsense Reasoning," downloaded from https://arxiv.org/pdf/1806.02847.pdf, 12 pages (Sep. 26, 2019).

Vaswani, A. et al., "Attention Is All You need," 31st Conference on Neural Information Processing Systems (NIPS2017), 11 pages (2017).

Ye, Z. et al., "Align, Mask and Select: A Simple Method for Incorporating Commonsense Knowledge into Language Representation Models," https://arxiv.org/pdf/1908.06725v4.pdf, 8 pages (Nov. 12, 2019).

Zhang, T. et al., "BERTScore: Evaluating Text Generation with BERT," ICLR 2020, 43 pages (2020).

U.S. Appl. No. 17/335,828, filed Jun. 1, 2021, entitled "Similarity Scoring Leveraging Constrained Greedy Matching".

* cited by examiner

CONTRASTIVE META-LEARNING FOR ZERO-SHOT LEARNING

BACKGROUND

Recently, natural language processing (NLP) has enjoyed unprecedented progress largely due to developments in context-aware representation learning. However, despite all the recent success in text understanding, a solution for commonsense reasoning is still far behind. Systems without the capacity of commonsense reasoning are unable to derive inherent relationships. Despite being seemingly simple for humans, it has remained a largely unsolved challenge for modern machine learning methods.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
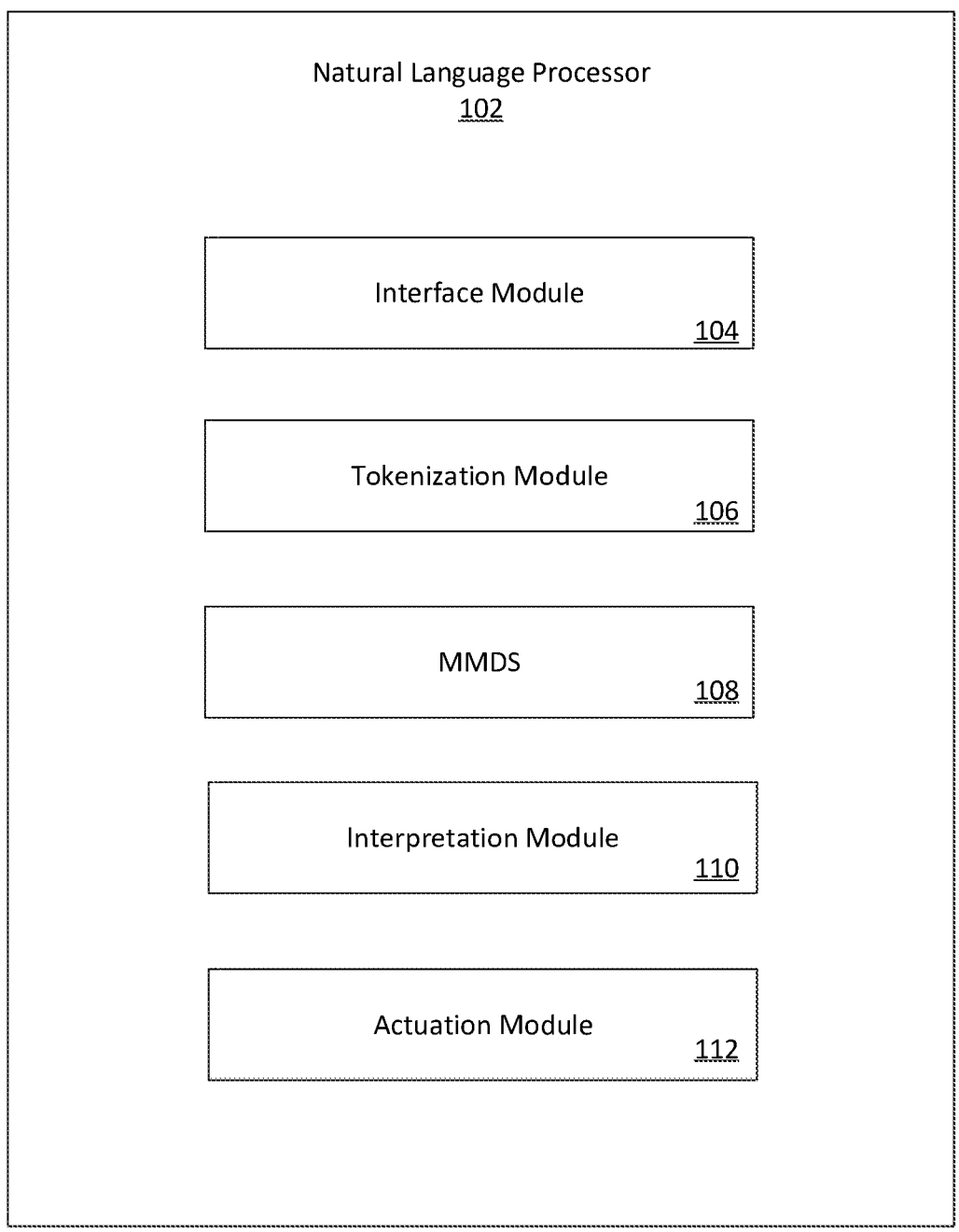
FIG. 1 is a block diagram of a natural language processing system, according to some embodiments.

Provided herein are system, apparatus, device, method and/or computer program product embodiments, and/or combinations and sub-combinations thereof, for machine learning configured with a meta-learning training set (small dataset), to create a predictive language model thus boosting the performance for downstream tasks. In some embodiments, the technology described herein is implemented for tasks of commonsense reasoning, which is related to robust and/or trustworthy Artificial Intelligence (AI). Because curating complete datasets for such tasks is intractable, leveraging meta-learning reduces training dataset size and corresponding time needed to create such.

In some embodiments, the technology described herein trains a machine language model with a meta-learning task based on semantic variations of a sentence. Implementing such a training model injects natural language processing capability into a predictive model that it may be used for downstream tasks without further training (i.e., zero-shot learning).

In some embodiments, the technology described herein provides a framework based on linguistic perturbations to promote generalization on Winograd schemas for pronoun disambiguation. Winograd schemas identify the antecedent of an ambiguous pronoun in a statement. Perturbations represent minor linguistic deviations from a regular or normal version. The process focuses on models exhibiting proper common-sense reasoning capability feature generalization and invariance to linguistic perturbations.

In some embodiments, the technology described herein provides a meta-learning task that improves generalization capability. To this end, the system leverages linguistic perturbations of training samples (data). Injecting the notion of perturbations in a language model equips the language model with the capability to augment the training set by leveraging generation. The perturbations, injected into language models, facilitate generation of associated perturbation embeddings. Experimental analysis of models trained on multiple datasets demonstrates superior zero-shot capabilities for commonsense reasoning and improved fine-tuning.

For example, perturbations of a sentence "The city councilmen refused the demonstrators a permit because they feared violence." may include, but are not limited to, "The city councilmen are refusing the demonstrators a permit because they fear violence.", "There was going to be a large protest in the city.", "The city councilmen refused the demonstrators a permit because they feared violence. This, however, did not deter them." and "The city councilmen, whom you had seen with the journalists, refused the demonstrators a permit because they feared violence."

However, instead of generating the perturbations explicitly at the sentence level, the linguistic perturbations reside in the latent space (representation of compressed data) only. While providing sufficient diversity to increase robustness, it simultaneously reduces the complexity in modeling. The learning framework is embedded in a contrastive framework. Contrastive learning is a framework that learns similar/dissimilar representations from data that are organized into similar/dissimilar pairs. Therefore, the contrastive learning model is derived over a limited set of commonsense concepts associated with consistent perturbations, while generalized to other concepts with unseen perturbations. The method may include a meta-contrastive learning framework that facilitates training a superior commonsense-aware language model as well as leverage generated perturbations in a self-supervised fashion to alleviate the scarcity of the available perturbation during representation learning phase.

FIG. 1 is a block diagram of a Natural Language Processor (NLP) system 100, according to some embodiments. The number of components in system 100 is not limited to what is shown and other variations in the number of arrangements of components are possible, consistent with some embodiments disclosed herein. The components of FIG. 1 may be implemented through hardware, software, and/or firmware. As illustrated, system 100 may comprise a Natural Language Processor (NLP) 102.

NLP 102 may include any device, mechanism, system, network, and/or compilation of instructions for performing natural language recognition of common sense attributes of similar sentences, consistent with the technology described herein. In the configuration illustrated in FIG. 1, NLP 102 may include an interface module 104, a tokenization module 106, a Master and Meta Data Search (MMDS) module 108, and interpretation module 110, and an actuation module 112. In certain embodiments, module 104, 106, 108, 110, and 112 may each be implemented via any combination of hardware, software, and/or firmware.

Interface module 104 may serve as entry point or user interface through which one or more sentences can be entered for subsequent similarity scoring (matching). In certain embodiments, interface module 104 may facilitate information exchange among and between NLP 102 and one or more users and/or systems. Interface module 104 may be implemented by one or more software, hardware, and/or firmware components. Interface module 104 may include one or more logical components, processes, algorithms, systems, applications, and/or networks. Certain functions embodied by interface module 104 may be implemented by, for example, HTML, HTML with JavaScript, C/C++, Java, etc. Interface module 104 may include or be coupled to one or more data ports for transmitting and receiving data from one or more components coupled to NLP 102. Interface module 104 may include or be coupled to one or more user interfaces (e.g., a GUI).

In certain configurations, interface module 104 may interact with one or more applications running on one or more computer systems. Interface module 104 may, for example, embed functionality associated with components of NLP 102 into applications running on a computer system. In one example, interface module 104 may embed NLP 102 functionality into a Web browser or interactive menu application with which a user interacts. For instance, interface module may embed GUI elements (e.g., dialog boxes, input fields, textual messages, etc.) associated with NLP 102 functionality in an application with which a user interacts. Details of applications with which interface module 104 may interact are discussed below in connection with FIGS. 2-4.

In certain embodiments, interface module 104 may include, be coupled to, and/or integrate one or more systems and/or applications, such as speech recognition facilities and Text-To-Speech (TTS) engines. Further, interface module 104 may serve as an entry point to one or more voice portals. Such a voice portal may include software and hardware for receiving and processing instructions from a user via voice. The voice portal may include, for example, a voice recognition function and an associated application server. The voice recognition function may receive and interpret dictation, or recognize spoken commands. The application server may take, for example, the output from the voice recognition function, convert it to a format suitable for other systems, and forward the information to those systems.

Consistent with embodiments of the present invention, interface module 104 may receive natural language queries (e.g., phrases or sentences) from a User and forward the queries to tokenization module 106.

Tokenization module 106 may transform natural language queries into semantic tokens. Tokenization module 106 may be implemented by one or more software, hardware, and/or firmware components. Tokenization module 104 may include one or more logical components, processes, algorithms, systems, applications, and/or networks. Tokenization module 106 may include stemming logic, combinatorial intelligence, and/or logic for combining different tokenizers for different languages. In one configuration, tokenization module 106 could receive an ASCII string and output a list of words. Tokenization module 106 may transmit generated tokens to MMDS module 108 via standard machine-readable formats, such as the expendable Markup Language (XML).

MMDS module 108 may be configured to retrieve information using tokens received from tokenization module 106. MMDS module 108 may be implemented by one or more software, hardware, and/or firmware components. MMDS module 108 may include one or more logical components, processes, algorithms, systems, applications, and/or networks. In one configuration, MMDS module 108 may include an API, a searching framework, one or more applications, and one or more search engines.

MMDS module 108 may include an API, which facilitates requests to one or more operating systems and/or applications included in or coupled to MMDS module 108. For example, the API may facilitate interaction between MMDS 108 and one or more structured data archives (e.g., knowledge base).

In one configuration, MMDS 108 may include an API that is exposed to one or more business intelligence systems, such as a Business Warehouse (BW). Such business intelligence systems may include or be based on a data warehouse optimized for environments such as an environment from SAP. These business intelligence systems may include various databases, systems, and tools.

In certain embodiments, MMDS module 108 may be configured to maintain a searchable data index, including meta data, master data, meta data descriptions, and/or system element descriptions. For example, the data index may include readable field names (e.g., textual) for meta data (i.e., table names and column headers), master data (i.e., individual field values), and meta data descriptions. The data index may be implemented via one or more hardware, software, and/or firmware components. In one implementation, a searching framework within MMDS 108 may initialize the data index, perform delta indexing, collect meta data, collect master data, and administer indexing. Such a searching framework may be included in one or more business intelligence applications (e.g., helpdesk, chatbots, voice interactive modules, etc.)

In certain configurations, MMDS module 108 may include or be coupled to a low level semantic analyzer, which may be embodied by one or more software, hardware, and/or firmware components. The semantic analyzer may include components for receiving tokens from tokenization module 106 and identifying relevant synonyms, hypernyms, etc. In one embodiment, the semantic analyzer may include and/or be coupled to a table of synonyms, hypernyms, etc. The semantic analyzer may include components for adding such synonyms as supplements to the tokens.

Consistent with embodiments of the present invention, MMDS module 108 may leverage various components and searching techniques/algorithms to search the data index using tokens received by tokenization module 106. MMDS module 108 may leverage one or more search engines that employ partial/fuzzy matching processes and/or one or more Boolean, federated, or attribute searching components.

In certain configurations, MMDS module 108 may include and/or leverage one or more information validation processes. In one configuration, MMDS module 108 may leverage one or more languages for validating XML information. MMDS module 108 may include or be coupled to one or more clients that include business application subsystems.

In certain configurations, MMDS module 108 may include one or more software, hardware, and/or firmware components for prioritizing information found in the data index with respect to the semantic tokens. In one example, such components may generate match scores, which represent a qualitative and/or quantitative weight or bias indicating the strength/correlation of the association between elements in the data index and the semantic tokens.

In one configuration, MMDS module 108 may include one or more learning components to enhance searching efficiency. In one example, such a learning component may observe and/or log information requested by users and may build additional and/or prioritized indexes for fast access to frequently requested data. Learning components may exclude frequently requested information from the data index, and such MMDS data may be forwarded to and/or included in interpretation module 110.

MMDS module 108 may output to interpretation module 110 a series of meta and/or master data technical addresses, associated field names, and any associated description fields. MMDS module 108 may also output matching scores to interpretation module 110.

Interpretation module 110 may process and analyze results returned by MMDS module 108. Interpretation module 110 may be implemented by one or more software, hardware, and/or firmware components. Interpretation module 104 may include one or more logical components, processes, algorithms, systems, applications, and/or networks. In one example, interpretation module 104 may include an agent network, in which agents make claims by matching policy conditions against tokenized natural language queries and context information.

Consistent with embodiments of the present invention, interpretation module 110 may be configured to recognize uncertainties associated with information identified by MMDS 108. For example, interpretation module 110 may identify ambiguities, input deficiencies, imperfect conceptual matches, and compound commands. In certain configurations, interpretation module 110 may initiate, configure, and manage user dialogs; specify and manage configurable policies; perform context awareness processes; maintain context information; personalize policies and perform context switches; and perform learning processes.

Interpretation module 110 may be configured to interact with interface module 104 in order to resolve uncertainties. For instance, upon identifying an uncertainty, interpretation module 110 may initiate a dialog with a user via interface module 104. To facilitate such a dialog, interface module 110 may, for example, leverage one or more GUIs.

In operation, interpretation module 110 may interact with one or more other modules within NLP 102. In one example, interpretation module 110 may dynamically interact with MMDS module 108 (e.g., as searches are performed) in order to resolve uncertainties as they arise.

Interpretation module 110 may provide one or more winning combinations of data elements to actuation module 112. Interpretation module 110 may filter information identified by MMDS module 110 in order to extract information that is actually relevant to input sentences. That is, interpretation module 110 may distill information identified by MMDS module 108 down to information that is relevant to the sentences and in accordance with intent. Information provided by interpretation module 110 (i.e., winning combination of elements) may include function calls, meta data, and/or master data. In certain embodiments, the winning combination of elements may be arranged in specific sequence to ensure proper actuation. Further, appropriate relationships and dependencies among and between various elements of the winning combinations may be preserved/maintained. For example, meta and master data elements included in a winning combination may be used to populate one or more function calls included in that winning combination.

Actuation module 112 may process interpreted information provided by interpretation module 110. Actuation module 112 may be implemented by one or more software, hardware, and/or firmware components. Actuation module 112 may include one or more logical components, processes, algorithms, systems, applications, and/or networks. Actuation module 112 may be configurable to interact with one or more system environments.

Consistent with embodiments of the present invention, actuation module 112 may be configured to provide information to one or more users/systems. In such embodiments, actuation module may interact with one or more information display devices.

In certain embodiments, actuation module 112 may be configured to send requests to one or more devices and/or systems using, for example, various APIs. Actuation module 112 may generate one or more presentations based on responses to such commands.

For clarity of explanation, interface module 104, tokenization module 106, MMDS module 108, interpretation module 110, and actuation module 112 are described as discrete functional elements within NLP 102. However, it should be understood that the functionality of these elements and modules may overlap and/or may exist in fewer elements and modules. Moreover, all or part of the functionality of these elements may co-exist or be distributed among several geographically-dispersed locations.

Figure 2:
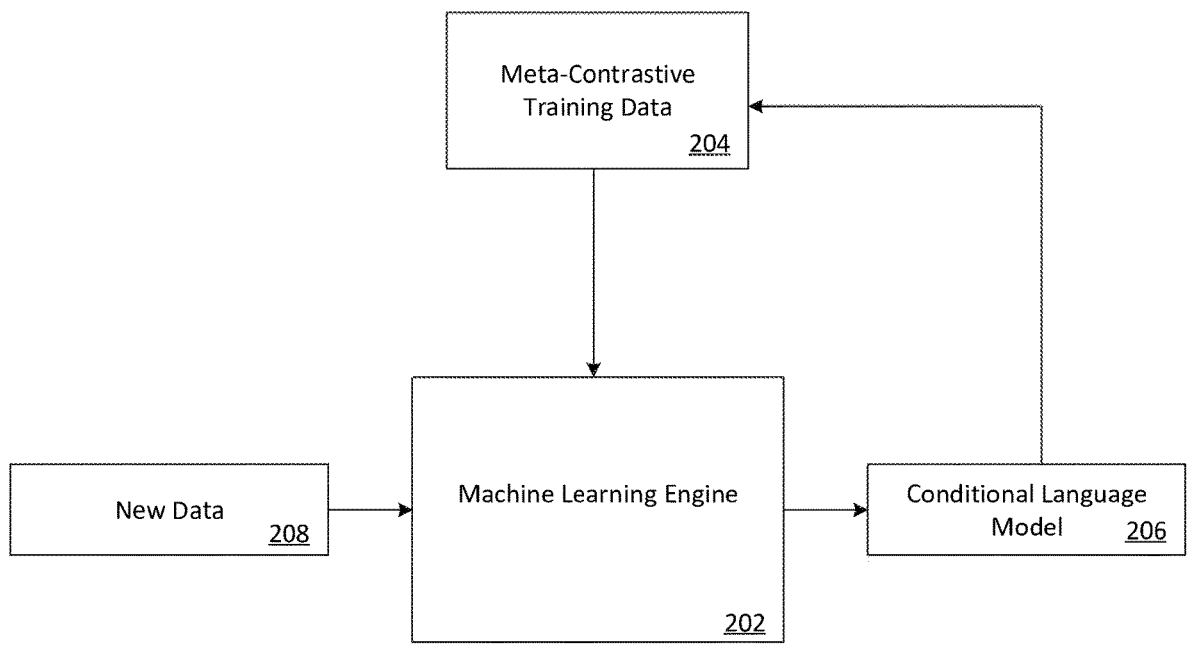
FIG. 2 is a block diagram of a machine learning system, according to some embodiments.

FIG. 2 is a block diagram of a machine learning system, according to some embodiments.

A machine learning system 200 may include a machine learning engine 202 of one or more servers (cloud or local) processing text, such as words, phrases or sentences, to recognize common-sense relationships of similar text (e.g., within sentences) received by a natural language system (100). Machine learning involves computers discovering how they can perform tasks without being explicitly programmed to do so. Machine learning (ML) includes artificial intelligence, deep learning, fuzzy learning, unsupervised learning, etc.

Machine learning may involve computers learning from data provided so that they carry out certain tasks. For more advanced tasks, it can be challenging for a human to manually create the needed algorithms. This may be especially true of teaching common-sense approaches to correctly associating pronouns (pronoun disambiguation) within varying sentence structures. The discipline of machine learning therefore employs various approaches to teach computers to accomplish tasks where no fully satisfactory algorithm is available. In cases where vast numbers of potential answers exist, one approach is to label some of the correct answers as valid. This can then be used as training data for the computer to improve the algorithm(s) it uses to determine correct answers. For example, to train a system for the task of digital character recognition, a dataset of handwritten digits has often been used.

In a first stage, training data set 204 (in this case meta-contrastive training data, i.e., base sentence with perturbations) may be ingested to train a model 206. In this case, a conditional language model (LM)) may be trained based on machine learning engine 202 processing the training data set 204. Training a model means learning (determining) values for weights as well as inherent bias from labeled examples. In supervised learning, a machine-learning algorithm builds a model by examining many examples and attempting to find a model that minimizes loss; this process is called empirical risk minimization. A language model assigns a probability of a next word in a sequence of words. A conditional language model is a generalization of this idea: it assigns probabilities to a sequence of words given some conditioning context.

In a second stage, the training cycle continuously looks at results, measures accuracy and fine-tunes the inputs to the modeling engine (feedback loop) to improve common-sense capabilities of the conditional language model.

In addition, as various modeling algorithms are created, they are stored in a database (not shown). For example, as the training sets are processed through the machine-learning engine 202, the conditional language model 206 may change and therefore may be recorded in this database.

Future new data 208 (e.g., sentences) common-sense concepts may be derived by evaluating with the trained conditional language model.

Figure 3:
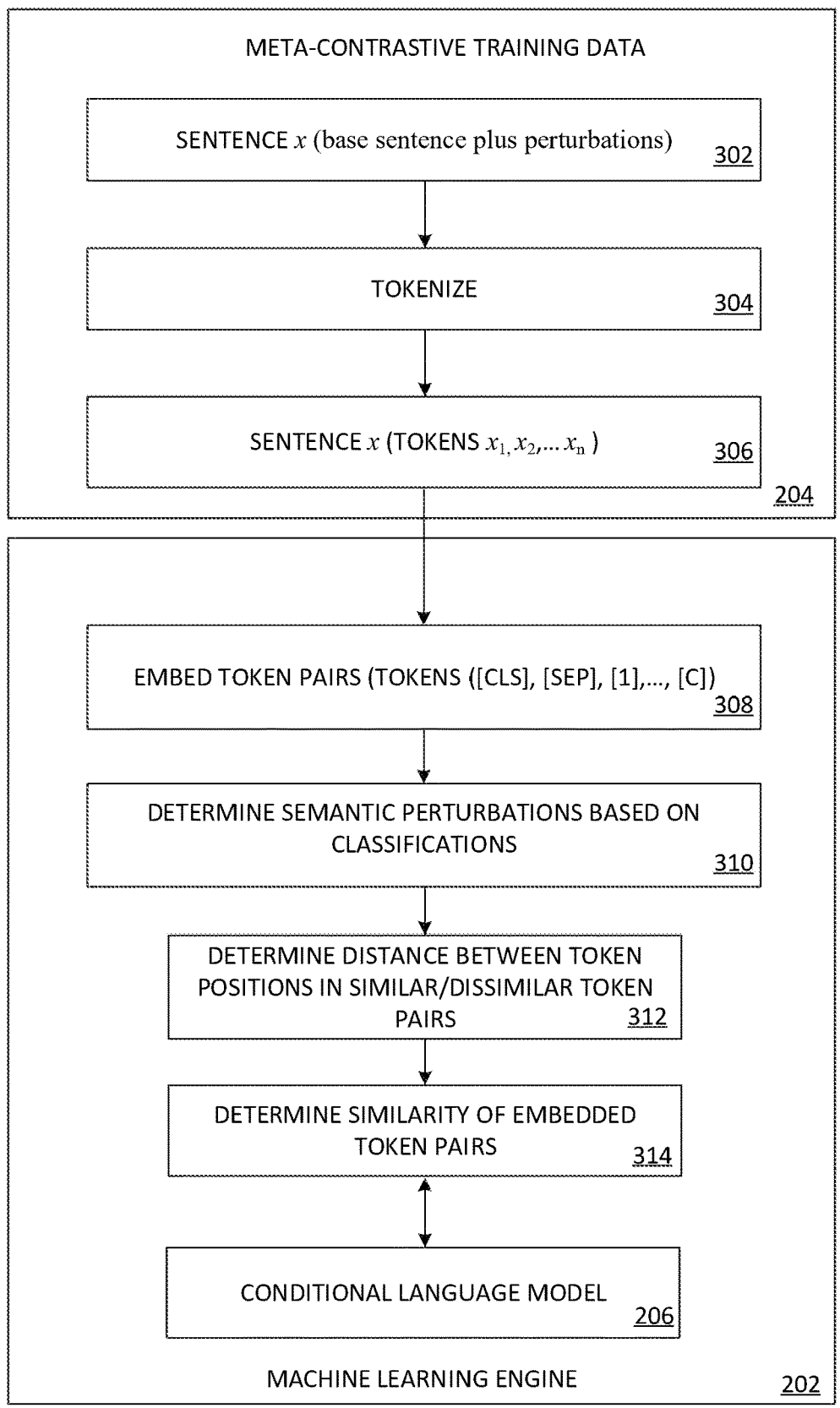
FIG. 3 is a flowchart illustrating training a language model, according to some embodiments.

FIG. 3 is a flowchart illustrating training a language model, according to some embodiments.

In some embodiments, adapting a language model and enforcing consistency across commonsense concepts includes embedding semantic perturbations into the training data, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3 as will be understood by a person of ordinary skill in the art.

Method 300 shall be described with reference to FIGS. 1-2. However, method 300 is not limited to these example embodiments.

A contrast between perturbations may be learned by employing a conditional language model. Given a sentence and a specific semantic perturbation, the conditional language model: M generates an approximated hallucination (estimation) of that specific semantic perturbation in the embedding space. An embedding space is a relatively low-dimensional space into which high-dimensional vectors are translated. Embeddings make it easier to perform machine learning on large inputs like sparse vectors representing words. Since the curation of a complete data set of commonsense concepts along with consistent perturbations is likely to be intractable, the system seeks to generate embeddings to accommodate for this. Ultimately, this entails harmonizing commonsense concepts with consistent semantic perturbation in an embedding space.

In some embodiments, a conditional language model is trained with embedded perturbations (meta-contrastive training data set 204). Given a sentence x (302), base and one or more perturbations of the base sentence, a language model specific tokenization module 106 generates (tokenizes 304) a token sequence "$x_1, x_2, \ldots, x_n$" 306. Tokenization normalizes natural language text by splitting a phrase, sentence, paragraph, or an entire text document into smaller units, such as individual words or terms. Each of these smaller units are called tokens. The tokens may be words, numbers or punctuation marks. Instantiation of language models (conditional language model 206) on the tokenized sequence 306 yields a sequence of embedding vectors denoted as $(x_1, \ldots, x_n)$ with $x_i \in \mathbb{R}^K$, where K represents a dimensionality of the token embeddings. To simplify the notation and subsuming the fact that only fixed-length sequences are encoded, which are obtained utilizing padding, the embeddings' domain is denoted as T. Transformer learning modules leverage tokens to frame tasks, i.e., [CLS] denotes the beginning and [SEP] the end of a sentence in NLP Bidirectional Encoder Representations from Transformers (BERT). BERT is a neural network-based technique for natural language processing pre-training. It is conventionally used to assist a NLP system to discern a context of words in search queries.

Furthermore, there are special tokens that are tailored to specific tasks. For example, [MASK] is used to mask-out words for learning a masked language model. Building upon the notion of associating tasks with tokens, the system enriches the language model 206 with additional specific tokens, referred to as "perturbation tokens". Perturbations represent minor linguistic deviations from a regular or normal version. The system determines the perturbation tokens (contextually similar) by following sematic rules inherent in a specific language model.

P denotes a set of semantic perturbations of cardinality |P|=C. The special token vocabulary V is extended by C elements (as shown in 310) accordingly—one for each p∈ P. For sake of simplicity, the system enumerates the perturbation tokens, V={[CLS], [SEP], [1], . . . , [C]} 308. Here, [0] (no change), and [1] indicates the generation of a perturbation constituting synonym(s). Then the objective is to learn a conditional $$LM, \hat{M}: S \times P \to T$$

that maps a sentence along with perturbation to an embedding tensor.

A transformer-based (conditional) learning model 206 is trained (by machine learning engine 202) by the sentence tokens with paired additional perturbation tokens.

To highlight that for a specific sample $x_i$, there exist multiple semantic perturbations, with notation $x_i^{[j]}$ denoting the embedding of j-th (ground truth) semantic perturbation of sample $x_i$ with:

$$j \in P, \text{ i.e., } x_i^{[j]} = \hat{M}(x_i[0]).$$

Conversely, the "generated" embeddings 308 are denoted as $\hat{x}_i^{[j]}$, which are obtained with:

$$\hat{x}_i^{[j]} = \hat{M}(x_i, [j]).$$

In order to assess the similarity of embeddings (embedded token pairs) 314, the system lets:

$$\varphi(x, \hat{x}): \mathbb{T} \times \mathbb{T} \to \mathbb{R},$$

denoting a distance metric 312 between sequence x and x^ (token pair positions).

In an example embodiment, meta-contrastive representation learning (MCL) is formalized as an optimization of a multi-player nonzero-sum game given as:

$$\min_{\theta_1, \theta_2} \mathcal{L}_R(f_{\theta_1}) + \mathcal{L}_C(f_{\theta_1}) + \mathcal{L}_D(f_{\theta_1}, q_{\theta_2})$$

Here f denotes the language module (LM), e.g., BERT or RoBERTa parameterized by $\theta_1$, and $q: \mathbb{T} \to P$ denotes an embedding classifier parameterized by $\theta_2$. RoBERTa (Robustly Optimized BERT) builds on BERT's language masking strategy, wherein the system learns to predict intentionally hidden sections of text within otherwise unannotated language examples. This allows RoBERTa to improve on a masked language-modeling objective compared with BERT and leads to better downstream task performance. The loss is learned in a supervised fashion on a dataset comprising multiple semantic perturbations per sample.

The first term, $L_R$ constitutes the Reconstruction. This enforces the similarity of the ground-truth perturbation from the training data with the generated ones. The second term $L_C$ denotes the Contrast loss is designed to enforce separation of commonsense concepts in the embedding space by maximizing a margin between embeddings of the sample pairs. The difference of the representation is the margin (e.g., if no margin, different items collapse on the same representation.)

The last term, $L_D$ enforces Diversity in the embedding space. Specifically, it seeks to prevent mode collapse of the different perturbations by enforcing discriminativeness utilizing a classifier. The classifier may include a concept mapper that may map common-sense concepts associated with a specific language structure to capture relationships between concepts and sentences. The classifier (discriminator) is trained to distinguish (recognize) semantic variations 310, e.g. past tense vs. future perturbations. Different variations may be classified to ensure no collapse and that variations can be distinguished.

Tackling this in a multitask fashion, yields the following loss terms: reconstruction loss, contrastive loss and diversity loss.

Reconstruction Loss: The reconstruction loss's objective is to align the generated embeddings with their corresponding ground-truth embeddings by minimizing their distance.

$$\mathcal{L}_R = -\alpha \sum_i^N \sum_{j \in P} \phi(x_i^{[j]}, \hat{x}_i^{[j]})$$

Contrastive Loss: The objective of the contrastive loss is to push apart the embeddings of different samples. This explicitly guarantees the conservation of each sample's semantic specifics and prevents the collapse to a generic perturbation representation. Hence, this term is the primary driver of injecting the notion of commonsense-aware perturbation into the language model.

$$\mathcal{L}_C = \beta \sum_{i,j:i \neq j}^N \sum_{k \in P} \phi(x_i^{[k]}, \hat{x}_i^{[k]})$$

Diversity Loss: The diversity loss term aims to guarantee discriminativeness of the embeddings. As such, it prevents the collapse of different embeddings. To this end, the system optimize the embedding along with learning a classifier. Hence, maximizing diversity entails minimization of cross-entropy with respect to perturbations:

$$\mathcal{L}_D = -\gamma \sum_i^N \sum_{j \in P} \log \frac{q(j \mid \hat{x}_i^{[j]})}{\sum_{t \in P: t \neq j} q(t \mid \hat{x}_i^{[t]})},$$

Here $q(.\mid.): \mathbb{T} \to \mathbb{R}$ denotes the likelihood of a classifier w.r.t. embeddings. N denotes the number of data samples, $\alpha$, $\beta$, $\gamma \in \mathbb{R}$ denote the hyper-parameters, harmonizing the different magnitudes of the components in this multitask learning scenario.

Training the language model includes first training the conditional language module on perturbations. Specifically, the system may employ an enhanced-WSC corpus, which is a perturbation-augmented version of an original Winograd Schema Challenge (WSC) dataset. The Winograd schema challenge (WSC) is a well-known test of machine intelligence. In one example embodiment, it consists of 285 sample sentences, with up to 10 semantic perturbations per sample. As similarity metric $\varphi(.,.)$ for the embeddings, the system may employ a (F1) BERT-score. It facilitates sentence-level similarity computation by matching tokens based on their cosine-distance and aggregating the scores. The system may employ a pre-trained BERT large-uncased architecture as well as RoBERTA large. The language model may be trained for 10 epochs for BERT and 5 for RoBERTa, using a batch size of 10 sentence samples. Each sample may be associated with four perturbations, yielding an effective batch size of 40. For training BERT, the system used $\alpha=130$, $\beta=0.5$, $\gamma=2.5$, and for RoBERTa used $\alpha=1.25$, $\beta=7.25$, $\gamma=6.255$. In one embodiment, for optimization, the system uses known Analysis Data Model (ADaM) data sets in combination with 500 warmup steps, cosine learning-rate decay, and a learning rate of $5.0^{-5}$ with $\epsilon=1.0^{-08}$ and $\epsilon=1^{-5}$ for BERT and RoBERTa, respectively. Note that during the meta-learning step, the system does not make use of WSC labels (i.e., which candidate is right or wrong).

The method may be evaluated in two setups:

(i) zero-shot: For evaluating the zero-shot capability of the meta-learned model, assess the pronoun disambiguation performance on multiple commonsense reasoning benchmarks. To this end, the system leverages the Masked Token Prediction (MTP) of BERT and RoBERTa, which entails replacing the pronoun with mask tokens. Subsequently, the LM is used to predict a mask replacement from the candidate set without any use of WSC labels.

(ii) fine tuning: Similarly, for fine-tuning the language model for the specific downstream task of pronoun disambiguation, the training of the (MTP) model by optimizing the likelihood of the correct candidate over the wrong answer. For this, the method fine-tunes the meta-learned LM model on the DPR training set or WinoGrande training, respectively. The fine tuning uses k-fold cross validation (k=5) and reports an average accuracy on the development set for both datasets.

The results of both setups on five commonsense reasoning benchmarks are reported in Table 1. The results show a consistent gain compared with the BERT baseline and a substantial improvement for RoBERTa. (Performance in accuracy (%).)

TABLE 1

| Method | DPR | GAP | KnowRef | WinoGender | W.G. |
|---|---|---|---|---|---|
| BERT-zero-shot | 58.51 | 58.70 | 62.36 | 62.50 | 51.70 |
| MCL-zero-shot (BERT) | 61.35 | 58.73 | 62.44 | 62.08 | 52.33 |
| RoBERTa-zero-shot | 70.39 | 58.87 | 60.42 | 61.67 | 53.75 |
| MCL-zero-shot (RoBERTa) | 76.95 | 59.13 | 63.97 | 69.17 | 55.01 |
| BERT-DPR-ft | 79.08 | 59.05 | 65.91 | 80.00 | 51.14 |
| MCL-DPR-ft (BERT) | 79.96 | 59.14 | 65.35 | 82.50 | 51.70 |
| BERT-WG-ft | 74.71 | 58.87 | 66.18 | 77.25 | 54.42 |
| MCL-WG-ft (BERT) | 75.35 | 58.86 | 66.34 | 78.33 | 55.29 |
| RoBERTa-DPR-ft | 87.23 | 59.05 | 66.32 | 81.67 | 57.54 |
| MCL-DPR-ft (RoBERTa) | 89.01 | 59.27 | 66.72 | 87.08 | 58.41 |
| RoBERTa-WG-ft | 84.04 | 59.11 | 64.24 | 80.58 | 62.11 |
| MCL-WG-ft (RoBERTa) | 84.57 | 59.11 | 64.18 | 79.83 | 62.47 |

Ablation Study: To assess the contribution of each loss term, the results were evaluated by performance of each component by removing them individually from the loss. See Table 2 for the ablation study on two benchmarks. As expected, the best results are achieved in the presence of all loss terms.

TABLE 2

| Ablation study, performance in accuracy (%) | | |
|---|---|---|
| Method | DPR | W.G. |
| RoBERTa (Liu et al., 2019) | 70.39 | 53.75 |
| MCL ($L_C + \mathcal{L}_D$) | 73.76 | 53.28 |
| MCL ($L_R + L_D$) | 65.60 | 53.59 |
| MCL ($L_R + L_C$) | 65.07 | 52.01 |
| MCL ($L_R + L_C + L_D$) | 76.95 | 55.01 |

As shown in the results, employing perturbations for commonsense reasoning boosts the performance of commonsense reasoning.

Figure 4:
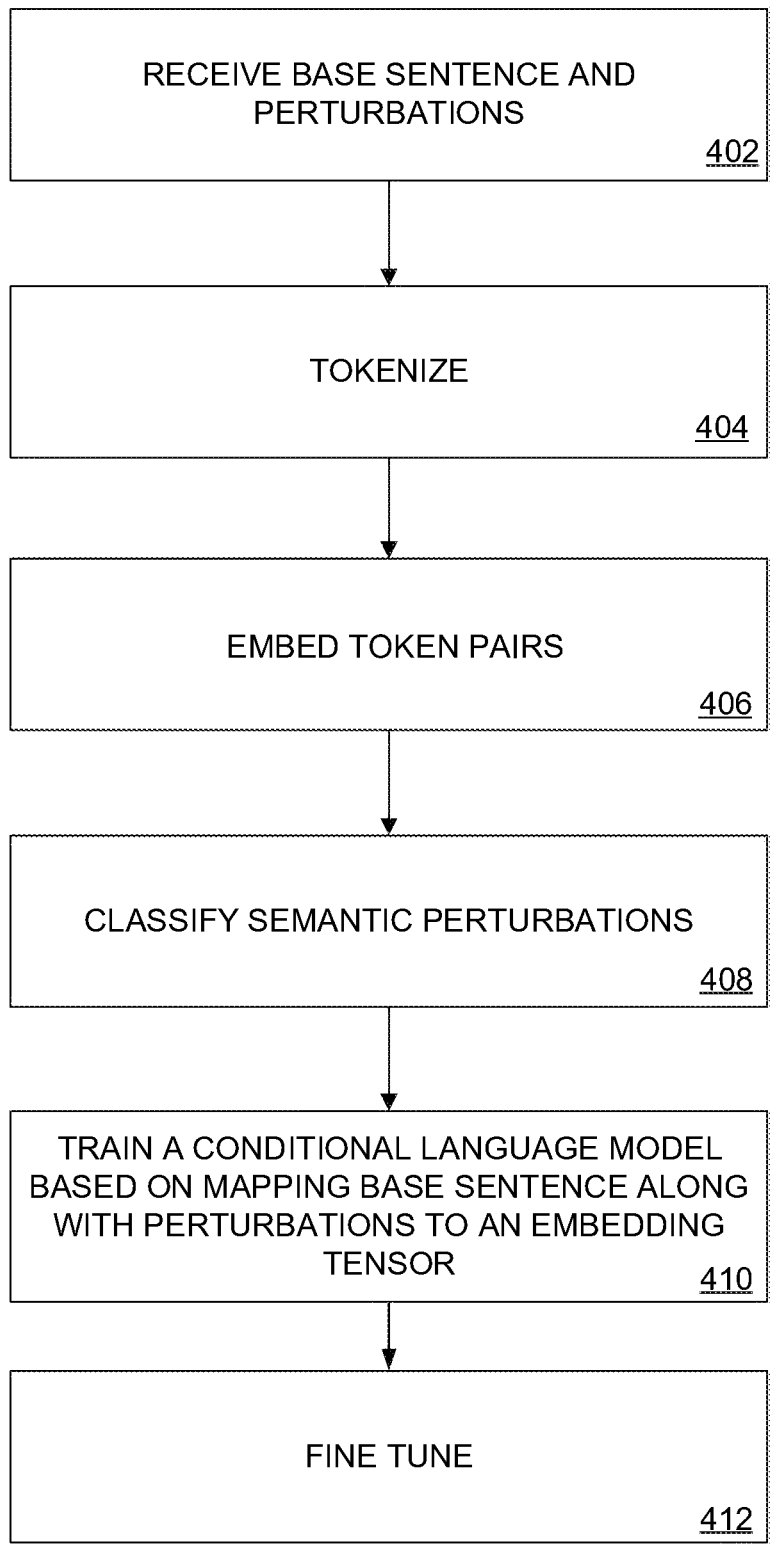
FIG. 4 is a flowchart illustrating training a language model, according to some embodiments.

FIG. 4 is a flowchart illustrating training a language model, according to some embodiments.

Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-3. However, method 400 is not limited to these example embodiments.

In one embodiment, the technology described herein is implemented for tasks of commonsense reasoning, which is related to robust/trustworthy AI. Because curating complete datasets for such tasks is intractable, leveraging meta-learning is extremely attractive. The generative aspects of the technology described herein have particular relevance for real-world applications.

In one or more embodiments, encouraging smoothness in loss landscapes may inject a more consistent notion of commonsense concepts and provide favorable representation properties that make it attractive for zero-shot learning.

For a language model to learn common-sense equivalent variations of this sentence and properly identify pronoun relationships, a training sequence configured with machine-learning may be implemented through hardware, software, and/or firmware.

In 402, a base sentence and one or more perturbations are received by the NLP system (e.g., interface module 104). For example, perturbations of a sentence "The city councilmen refused the demonstrators a permit because they feared violence." may include "The city councilmen are refusing the demonstrators a permit because they fear violence" or "There was going to be a large protest in the city." These semantic perturbations are generated based on known language rules and may include classifications. For example, the system could simply replace words like 'is' with 'was', 'He' with 'she', etc.

In 404, the received base sentence and one or more perturbations are tokenized. Given a sentence x, a language model specific tokenizer generates a token sequence "$x_1, x_2, \ldots, x_n$". Tokenization normalizes natural language text by splitting a phrase, sentence, paragraph, or an entire text document into smaller units, such as individual words or terms. Each of these smaller units are called tokens. The tokens may be words, numbers or punctuation marks.

In 406, selected perturbations are embedded into the token sequence. The LM may perform embedding by pairing semantically similar tokens, thus generating embeddings for sentences (training data). Sentences can be vary in structure and content and include a perturbed sentence.

In 408, semantic perturbations of the various tokens are classified by a classifier to assist the machine-learning engine to learn (recognize) sentence level similarities. The classifier may include a concept mapper that may map common-sense concepts associated with a specific language structure to capture relationships between concepts and sentences (generates a classification). The classifier (discriminator) is trained to distinguish semantic variations, e.g. past tense vs. future perturbations. Different variations may be classified to ensure no collapse and that variations can be distinguished.

In 410, the conditional language model is trained based on mapping a sentence along with perturbation to an embedding sensor.

In 412, the conditional language model is fine-tuned. For example, the LM is trained with ADaM data sets as previously defined above.

Figure 5:
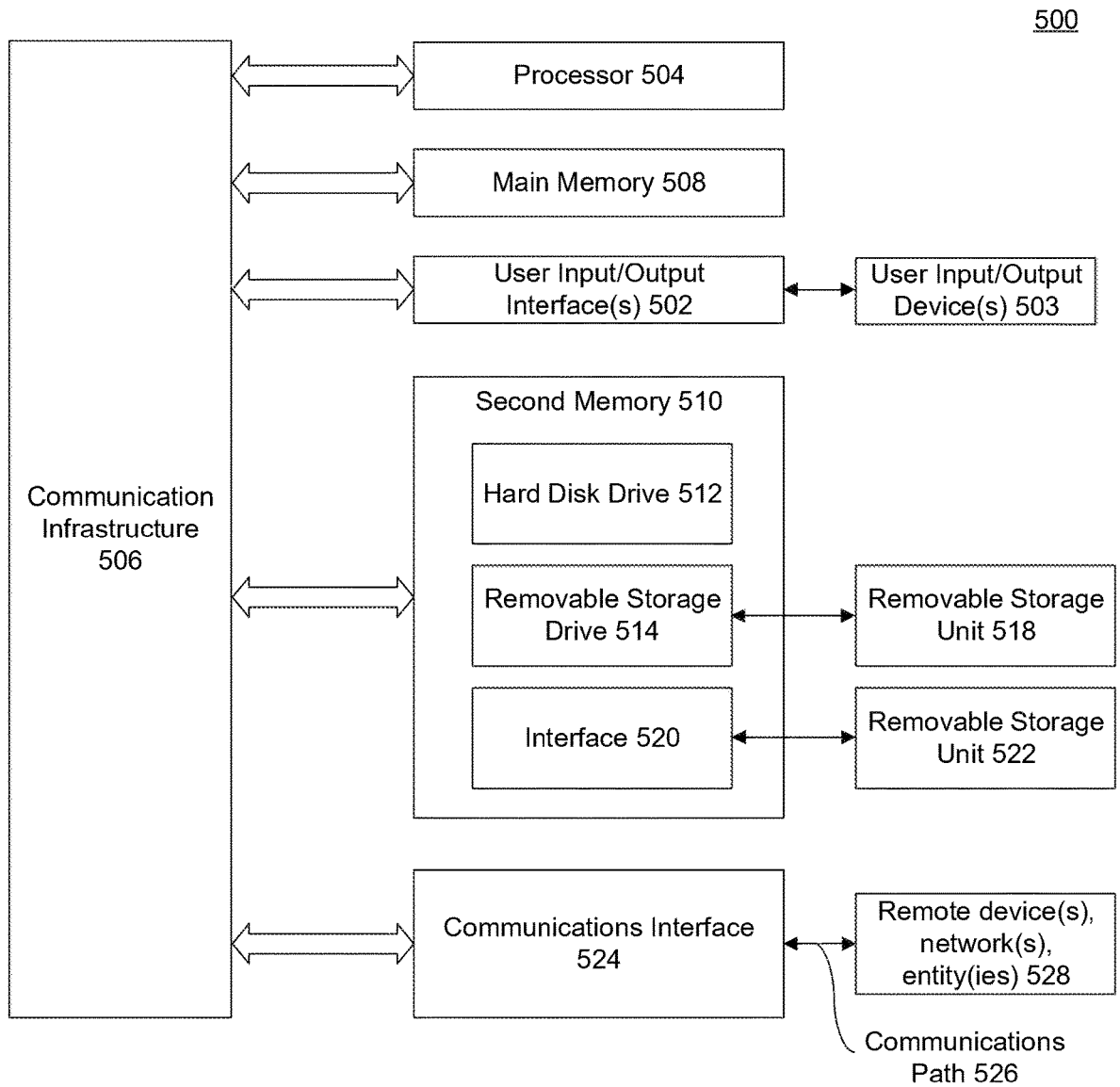
FIG. 5 is an example computer system useful for implementing various embodiments.

Various embodiments can be implemented, for example, using one or more computer systems, such as computer system 500 shown in FIG. 5. Computer system 500 can be used, for example, to implement method 400 of FIG. 2. For example, computer system 500 can replay dynamic SQLs in an ASE workload analyzer. Computer system 500 can be any computer capable of performing the functions described herein.

FIG. 5 is an example computer system useful for implementing various embodiments. Various embodiments can be implemented, for example, using one or more computer systems, such as computer system 500. Computer system 500 may be used, for example, to implement method 300 or any other embodiments described herein. For example, computer system 500 can federate custom resources between an orchestration cluster and a worker cluster. Computer system 500 can further provide server proxy services in a worker cluster, according to some embodiments. Computer system 500 can be any computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure or bus 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired, and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for natural language processing, the method comprising:
   receiving, by a tokenization module, a base sentence and one or more sentences comprising a semantic perturbation of the base sentence as an input, wherein the semantic perturbation of the base sentence comprises one or more linguistic deviations of the base sentence from a first version;
   tokenizing, by the tokenization module, the input to generate a sequence of tokens;
   embedding, by a machine learning engine, tokens of the semantic perturbation with tokens of the base sentence as tokens pairs to generate training data;
   classifying, by a classifier, the semantic perturbation of the token pairs to capture relationships of the base sentence and the one or more sentences to generate a classification; and
   training, by the machine learning engine, a language model based at least in part on the training data and the classification; and
   wherein at least one of the receiving, tokenizing, determining, embedding and training are performed by one or more computers.

2. The method of claim 1, the tokenizing the input comprising:
   splitting the base sentence and the one or more sentences into smaller units.

3. The method of claim 2, wherein the smaller units include any of:
   individual words, terms, numbers or punctuation marks.

4. The method of claim 1, the embedding comprising pairing contextually similar tokens.

5. The method of claim 4, the classifying further comprising:
recognizing contextually similar tokens.

6. The method of claim 1, the classifying further comprising:
mapping common-sense concepts associated with a specific language structure to capture the relationships between concepts of the base sentence and the one or more sentences.

7. The method of claim 1, the training further comprising:
limiting a distance of relative positions of token pairs in the sequence of tokens.

8. A system, comprising:
a memory; and
at least one processor coupled to the memory and configured to:
receive a base sentence and one or more sentences comprising a semantic perturbation of the base sentence as an input, wherein the semantic perturbation of the base sentence comprises one or more linguistic deviations of the base sentence from a first version;
tokenize the input to generate a sequence of tokens;
embed tokens of the semantic perturbation with tokens of the base sentence as tokens pairs to generate training data;
classify the semantic perturbation of the token pairs to capture relationships of the base sentence and the one or more sentences to generate a classification; and
train a language model based, at least in part, on the training data and the classification.

9. The system of claim 8, wherein to tokenize the input, the at least one processor is configured to:
split the base sentence and the one or more sentences into smaller units.

10. The system of claim 9, wherein the smaller units include any of:
individual words, terms, numbers or punctuation marks.

11. The system of claim 8, wherein to embed the one or more semantic perturbations, the at least one processor is configured to pair contextually similar tokens.

12. The system of claim 11, wherein to classify the semantic perturbation of the token pairs, the at least one processor is configured to:
recognize contextually similar tokens.

13. The system of claim 8, wherein to execute to train the language model, the at least one processor is configured to:
map common-sense concepts associated with a specific language structure to capture the relationships between concepts and sentences.

14. The system of claim 8, wherein to train the language model, the at least one processor is configured to:
limit a distance of relative positions of token pairs in the sequence of tokens.

15. A non-transitory computer-readable device having instructions stored thereon that, when executed by at least one computing device, cause the at least one computing device to perform operations comprising:
receiving a base sentence and one or more sentences comprising a semantic perturbation of the base sentence as an input, wherein the semantic perturbation of the base sentence comprises one or more linguistic deviations of the base sentence from a first version:
tokenizing the input to generate a sequence of tokens;
embedding tokens of the semantic perturbation with tokens of the base sentence as tokens pairs to generate training data;
classifying the semantic perturbation of the token pairs to capture relationships of the base sentence and the one or more sentences to generate a classification; and
training a language model based at least in part on the training data and the classification.

16. The non-transitory computer-readable device of claim 15, the tokenizing the input comprising:
splitting the base sentence and one or more sentences into smaller units.

17. The non-transitory computer-readable device of claim 16, wherein the smaller units include any of: individual words, terms, numbers or punctuation marks.

18. The non-transitory computer-readable device of claim 15, wherein the embedding comprises pairing contextually similar tokens.

19. The non-transitory computer-readable device of claim 15, wherein the classifying further comprises:
recognizing contextually similar tokens.

20. The non-transitory computer-readable device of claim 15, the raining further comprising:
mapping common-sense concepts associated with a specific language structure to capture the relationships between concepts of the base sentence and the one or more sentences.

* * * * *